March 27, 1951 M. PODNAR 2,546,519
COMBINED WAGON BOX AND RACK
Filed March 31, 1947 2 Sheets-Sheet 1
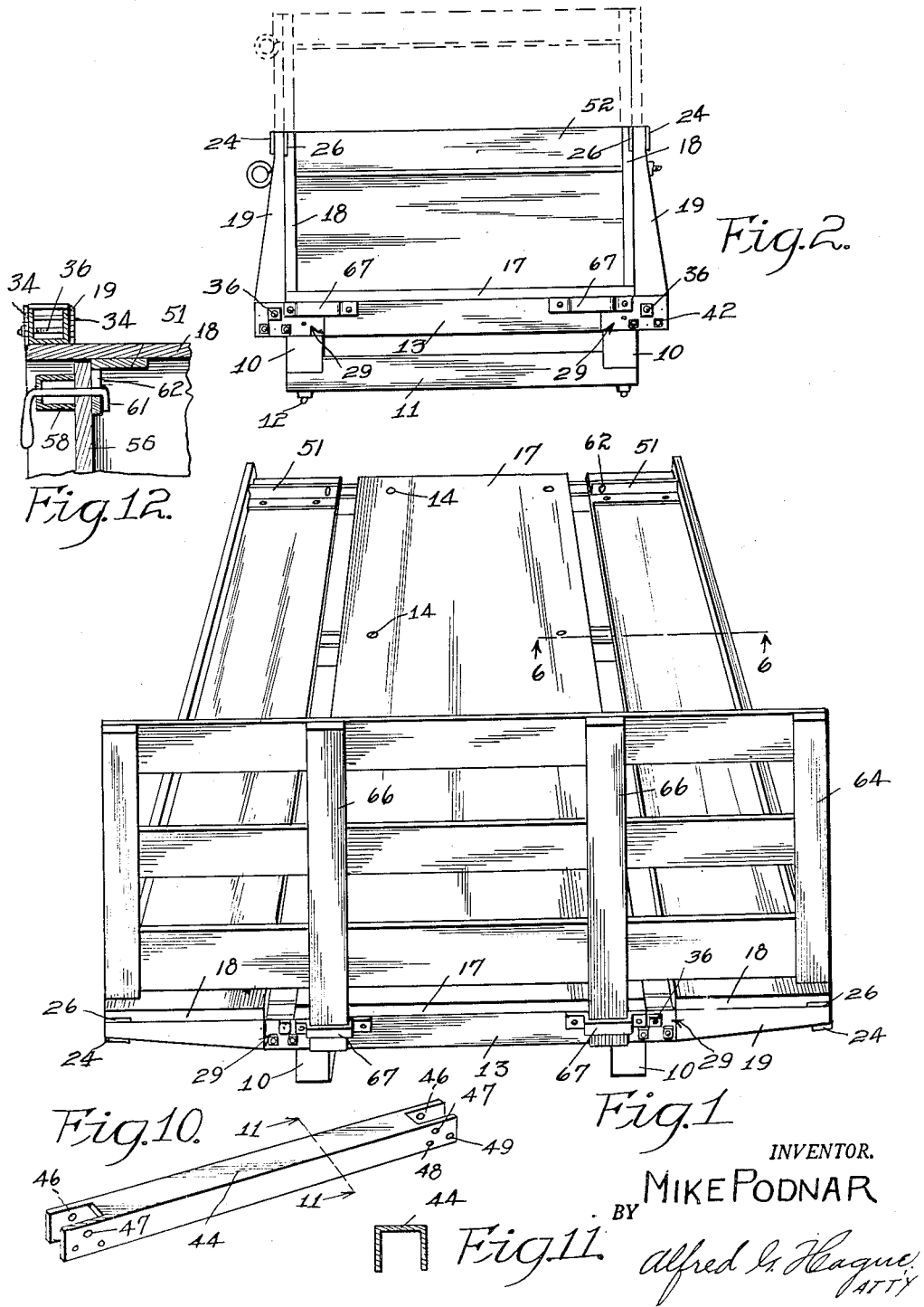
INVENTOR.
MIKE PODNAR
BY Alfred G. Hague
ATTY March 27, 1951     M. PODNAR     2,546,519
COMBINED WAGON BOX AND RACK
Filed March 31, 1947     2 Sheets-Sheet 2
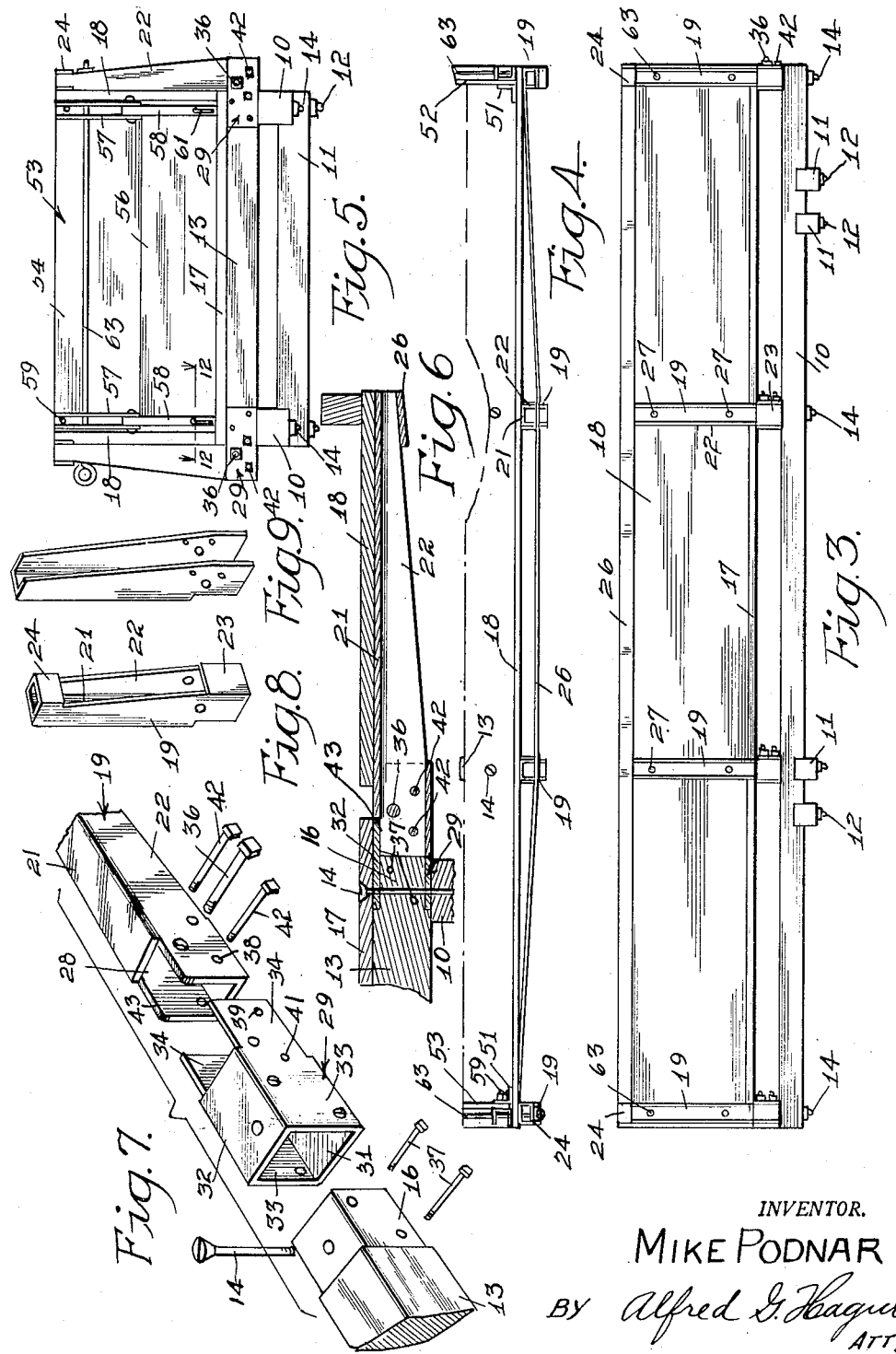
INVENTOR.
MIKE PODNAR
BY Alfred G. Hague
ATT'Y Patented Mar. 27, 1951

2,546,519

UNITED STATES PATENT OFFICE 2,546,519

COMBINED WAGON BOX AND RACK

Mike Podnar, Ankeny, Iowa

Application March 31, 1947, Serial No. 738,366

1 Claim. (Cl. 296—11)

This invention relates to improved wagon or truck beds in which the sides are hinged to the bed bottom to swing from a closed upright position to form a tight box for the transportation of small grain and like, to an open horizonal position, to form a rack for hauling lighter and more bulky material such as loose or baled hay or straw.

The object of my invention is to provide a single wagon or truck bed which will serve the purpose of either a compact and tight box for hauling heavy and small material such as small grain and the like; or which may be converted to a rack for hauling more bulky and lighter material such as hay or straw, either baled or loose without the necessity of changing boxes or bed, as is the usual practice at the present time, to enable the wagon or truck to be adapted to either purpose.

A further object of my invention is to provide a combination wagon box and rack of simple and rigid construction which may be easily and quickly changed from a box to a rack or vice versa without the use of tools or other apparatus other than a wrench such as is owned by all wagon or truck owners.

Another object of my invention is to provide in a combined wagon box and rack structure, embodying a frame having a fixed floor and hinged side members, improved means for hinging the side members to the frame, and for locking them in either of their adjusted positions without obstructing the loading or unloading of the material to be hauled.

A further object of my invention is to provide in a wagon box structure of the type above described, improved means for reinforcing the free edges of the side members when in operative position.

My invention consists in the construction, arrangement and combination of the various parts of the device whereby the objects contemplated are attained as hereinafter more fully set forth, pointed out in my claim and illustrated in the accompanying drawings, in which:

Figure 1 is a front perspective view of my improved combined wagon box and rack having its sides in position to form a rack and illustrating the manner that the frame forming the front is applied.

Figure 2 is a front end elevation of the device showing the sides closed with the front endgate in position to form a tight wagon box.

Figure 3 is a side elevation of Figure 2.

Figure 4 is a plan view of a segmental portion of the box, illustrating the manner that the top edge of the central portion of the side is reinforced against outward movement when used as a box and against downward movement when used as a rack.

Figure 5 is an end elevation of the back end of the box.

Figure 6 is a sectional view taken on the line 6—6 of Figure 1.

Figure 7 is an exploded view of one end of one bolster, its bolster stake and their hinge assembly.

Figure 8 is a perspective view of my preferred form of bolster stake.

Figure 9 is a perspective view of a modified form of bolster stake.

Figure 10 is a perspective view of a modified form of bolster.

Figure 11 is a detail sectional view taken on the line 11 of Figure 10.

Figure 12 is an enlarged detail sectional view taken on the line 12 of Figure 5.

Referring to the drawings in detail, wherein like numerals of reference denote corresponding parts, the reference numeral 10 indicates bolster supports spaced apart and fixed to bolster stops 11; said members being rigidly secured together by bolts 12. Mounted on the supports 10 is a plurality of transversely arranged bolsters 13, preferably formed rectangular in cross section of wood and secured in place by bolts 14. Each end 16 of the bolster is somewhat contracted and projecting beyond the adjacent support 10. Mounted on the bolster 13 is a tight floor 17 which serves as a bottom for both the box and the rack.

I have provided side members 18, also formed tight, of any desired width, preferably of about one-half the width of the floor 17. For pivotally securing the lower edge of each side member 18 to the corresponding side edge of the floor, I have fixed to the outer surface of each side 18 a bolster stake 19 for each end member 16, said stake being preferably formed of metal having a back 21 and tapering sides 22, the lower ends of the sides having a reinforcing cross plate 23. The end stakes 19 have at their upper ends a cross plate 24, while the intermediate stakes 19 have at their upper end a truss bar 26 having its ends mounted between the upper ends of the end stakes 19 and the upper edge of the side 18, and fixed to the stakes by welding or rivets. See Figure 4. The stakes are secured to the sides 18 by rivets or bolts 27. The lower end of the back member 21 is cut away at 28 for the purpose hereinafter made clear.

For pivotally connecting the lower ends of the stake 19 to their respective bolster portions 16, I have provided what I shall term a hinge bracket 29. The bracket 29 comprises a bottom portion 31, a top 32 and sides 33. The bottom 31 is somewhat shorter than the top 32, while the outer ends of the sides 33 extend beyond the top to form spaced flanges 34 adapted to receive between them the lower end of the sides 22 of the bolster stakes 19. A bolt 36 provides means for pivotally connecting the stakes and hinge brackets. The inner ends of the members 31, 32 and 33 form a socket for receiving the contracted portion 16 of the respective bolster 13. The bracket is fixed in position by bolts or rivets 37. The lower end of each side member 22 of the bolster stake 19 is provided with an opening 38 adapted to align with an opening 39 in the members 34, when the stakes are in an upright position, and with openings 41 when the stakes are in a horizontal position. Bolts 42 provide means for fixing the stakes in either of said positions. The inner edges 43 of the lower ends of the stakes are adapted to engage the under face of the plate 32 when the side member 18 and the stakes are in a horizontal position to provide positive and rigid means for limiting the downward movement of the outer edge of said side member 18 when used as a rack without the use of auxiliary braces or chains. The bolts 42 serve to limit the upward movement of the outer edges of said side members to prevent unnecessary bouncing of the sides when empty and the vehicle is moved rapidly over the ground surface.

The bottom edges of the side members 18 are adapted to be supported above and rest on the side edges of the floor when in an upright position as shown in Figure 5 to form a graintight joint. The bolsters are preferably made of wood. They might be formed of standard structural U bars of pressed sheet metal as illustrated in Figures 10 and 11; each end of the top of the body 44 being cut away to form notches 46 to receive the stake 19. Opening 47 is provided for the bolts 36 and holes 48 and 49 for the bolts 42.

The inner faces of the front and back ends of the sides have angle irons 51 to serve as stops for endgates 52 and 53. The back endgate 53 is formed preferably of an upper section 54 and a lower section 56. The upper section is reinforced by channels 57 and the lower section with oppositely arranged channels 58. The upper end of the channels 58 are pivoted to the lower ends of the channels 57 to permit the lower section to move to open position for dumping the contents of the box. The upper section is fixed to the angle irons 51 by bolts 59. The lower edge of the member 56 is detachably fastened to the angles 51 by latches 61 projecting through slots 62 in the angle 51 as clearly illustrated in Figure 12, and locking by rotating the latch 90°.

The front and back ends of the box are tied together by the usual endgate rods 63. In the practical operation of my improved box and rack, assuming that it is desired to convert the box, illustrated in Figures 2, 3, 4 and 5, to the rack illustrated in Figures 1 and 6, the operator first removes the rods 63 and the front endgate 52. Bolts 59 are then removed from the angles 51 and the latches 61 are then released, permitting the endgate 53 to be removed. Bolts 42 are then removed permitting the sides 18 to swing to a horizontal position as illustrated in Figures 1 and 6, with the upper edges of the member 43 engaging the plates 32 and the inner edges of the member 23 engaging the outer edges of the member 31. The bolts 42 may then be replaced. The upright front rack 64 may then be placed in position, the lower ends of the upright 66 being placed in strap 67, secured to the front bolster 13, as clearly illustrated in Figure 1.

Thus it will be seen that I have provided an improved wagon box and rack combination of simple, durable and rigid construction, which is adapted to be easily and quickly converted to either a wagon box or a rack, wherein the owner might deliver a load of bulky material such as hay or straw to market with the side members 18 lowered to horizontal position to serve as a rack; and return with a load of heavy material such as lime, in which case the side members 18 are closed with the endgates in position to form a tight box without having to make an extra trip and without having to change the rack for a box as is customary at this time. Furthermore he is not required to provide extra storage for the box or rack not used.

I claim:

In a device of the class described, a bolster having each end terminating in a socket rectangular in cross section and having extending side walls to form spaced flanges; a bolster stake for each end of said bolster, supported normally in a vertical position, each stake comprising a back having outwardly extending and spaced sides, the bottom and top ends of the outer edges of said sides each having a corresponding upper and lower cross bar fixed thereto, means pivoting the lower ends of the stakes to the corresponding flanges of said bolsters to swing from said vertical position to a horizontal position with the said lower ends of said stakes engaging the under surface of the top of said bolster socket, with the lower edge of said lower cross bar against the outer end of the bottom of said bolster to limit the downward movement of the free end of the stake, said flanges and stakes each having an opening and a cooperating pin for locking the stakes in either vertical or horizontal position.

MIKE PODNAR.

REFERENCES CITED

The following references are of record in the file of this patent:

UNITED STATES PATENTS

| Number | Name | Date |
|---|---|---|
| 134,996 | Luttgens | Jan. 21, 1873 |
| 464,632 | Dicken | Dec. 8, 1891 |
| 526,261 | Rhoads | Sept. 18, 1894 |
| 711,434 | Mock | Oct. 14, 1902 |
| 780,299 | Marlay | Jan. 17, 1905 |
| 953,509 | Bird | Mar. 29, 1910 |
| 1,281,145 | Cruise | Oct. 8, 1918 |
| 1,328,130 | Crandall | Jan. 13, 1920 |
| 2,054,122 | Eisenberg, Jr. | Sept. 15, 1936 |

FOREIGN PATENTS

| Number | Country | Date |
|---|---|---|
| 632,039 | Germany | July 1, 1936 |